US012790421B2

(12) United States Patent
Shin et al.

(10) Patent No.: US 12,790,421 B2
(45) Date of Patent: Nov. 10, 2026

(54) METHOD FOR PREPARING COPOLYMER, COPOLYMER PREPARED THEREFROM, AND THERMOPLASTIC RESIN COMPOSITION COMPRISING THE SAME

(71) Applicant: LG CHEM, LTD., Seoul (KR)

(72) Inventors: Min Seung Shin, Daejeon (KR); Hyung Sub Lee, Daejeon (KR); Dae Woo Lee, Daejeon (KR); Min Cheol Ju, Daejeon (KR); Sung Won Hong, Daejeon (KR); In Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 596 days.

(21) Appl. No.: 17/919,565

(22) PCT Filed: Nov. 18, 2021

(86) PCT No.: PCT/KR2021/016985
§ 371 (c)(1),
(2) Date: Oct. 18, 2022

(87) PCT Pub. No.: WO2022/108358
PCT Pub. Date: May 27, 2022

(65) Prior Publication Data

US 2023/0144513 A1 May 11, 2023

(30) Foreign Application Priority Data

Nov. 20, 2020 (KR) ........................ 10-2020-0156419

(51) Int. Cl.
*C08F 212/10* (2006.01)
*C08L 25/12* (2006.01)

(52) U.S. Cl.
CPC ............ *C08F 212/10* (2013.01); *C08L 25/12* (2013.01)

(58) Field of Classification Search
CPC ............................... C08F 212/10; C08L 25/12
See application file for complete search history.

(56) References Cited

U.S. PATENT DOCUMENTS

| | | | | |
|---|---|---|---|---|
| 5,412,036 | A | 5/1995 | Traugott et al. | |
| 5,446,103 | A | 8/1995 | Traugott et al. | |
| 2010/0036065 | A1* | 2/2010 | Sohn | C08F 212/12 526/262 |
| 2011/0040035 | A1 | 2/2011 | Shields et al. | |
| 2015/0376316 | A1 | 12/2015 | Heo et al. | |
| 2020/0369813 | A1 | 11/2020 | Matsumoto et al. | |
| 2022/0275127 | A1 | 9/2022 | Shin et al. | |
| 2022/0356285 | A1 | 11/2022 | Nakanishi et al. | |

FOREIGN PATENT DOCUMENTS

| | | | | |
|---|---|---|---|---|
| CN | 113614129 | A | 11/2021 | |
| EP | 3974458 | A1 | 3/2022 | |
| EP | 3998148 | A1 | 5/2022 | |
| JP | S63-162708 | A | 7/1988 | |
| JP | H5-155906 | A | 6/1993 | |
| JP | H07-091341 | B2 | 10/1995 | |
| JP | 3241815 | B2 | 12/2001 | |
| KR | 10-0360947 | B1 | 1/2003 | |
| KR | 10-2003-0034928 | A | 5/2003 | |
| KR | 10-2008-0058379 | A | 6/2008 | |
| KR | 10-2015-0066386 | A | 6/2015 | |
| KR | 10-1739621 | B1 | 6/2017 | |
| KR | 10-2020-0103640 | A | 9/2020 | |
| WO | WO 2021006265 | * | 1/2021 | C08F 234/00 |

OTHER PUBLICATIONS

Machine Translation of Description of JPH0791341 B2 (Year: 1988).*
Office Action issued on Apr. 17, 2024 for the corresponding Chinese Patent Application 202180027245.1 Note: JP H07-091341 cited therein is already of record.
Office Action issued on May 16, 2024 for the corresponding Korean Patent Application 10-2020-0156419.
Extended European Search Report issued Aug. 8, 2023 for corresponding European Patent Application 21895126.7 Citation: JP H07-91341 B2 previously cited in IDS on Oct. 18, 2022.
International Search Report (with partial translation) and Written Opinion dated Feb. 28, 2022, for corresponding International Patent Application No. PCT/KR2021/016985.

* cited by examiner

*Primary Examiner* — Heidi R Kelley
*Assistant Examiner* — Adam J Berro
(74) *Attorney, Agent, or Firm* — Morgan, Lewis & Bockius LLP

(57) ABSTRACT

The present disclosure relates to a method for preparing a copolymer, a copolymer prepared therefrom, and a thermoplastic resin composition including the copolymer. The method includes introducing and polymerizing an aromatic vinyl-based monomer, a vinyl cyan-based monomer, and an imide-based monomer, wherein the imide-based monomer is introduced at once in an amount of 1 wt % to 24 wt % before the start of polymerization, and is continuously introduced in an amount of 76 wt % to 99 wt % from the start of the polymerization.

12 Claims, No Drawings

METHOD FOR PREPARING COPOLYMER, COPOLYMER PREPARED THEREFROM, AND THERMOPLASTIC RESIN COMPOSITION COMPRISING THE SAME

CROSS-REFERENCE TO RELATED APPLICATIONS

This application claims the benefit of Korean Patent Application No. 10-2020-0156419, filed on Nov. 20, 2020, in the Korean Intellectual Property Office, the disclosure of which is incorporated herein in its entirety by reference.

TECHNICAL FIELD

The present invention relates to a method for preparing a copolymer, and specifically, to a method for preparing a heat-resistant copolymer using an aromatic vinyl-based monomer, a vinyl cyan-based monomer, and an imide-based monomer, a copolymer prepared therefrom, and a thermoplastic resin composition including the copolymer.

BACKGROUND ART

In general, a styrene-based copolymer has excellent moldability, rigidity, and electrical properties, and thus is widely used in various industrial fields including OA devices and equipment such as computers, printers, photocopiers, home appliances such as televisions and audio, electrical and electronic components, automotive parts, miscellaneous goods, and the like.

Among these, for products that require heat resistance, such as automotive interior and exterior materials, a heat-resistant styrene-based copolymer and a diene-based graft copolymer such as an ABS resin are mixed and used. Here, the heat-resistant styrene-based copolymer is prepared by adding a heat-resistant monomer such as α-methylstyrene monomer or a maleimide-based monomer such as N-phenylmaleimide in order to increase heat resistance, and a maleimide-based monomer is particularly used in highly heat-resistant products.

However, a maleimide-based monomer forms a charge transfer complex with an aromatic vinyl-based monomer such as styrene, thereby forming an alternating copolymer of the aromatic vinyl-based monomer and the maleimide-based monomer at the beginning of polymerization, and as the maleimide-based monomer is consumed, the composition of each monomer in a copolymer is variously changed.

Specifically, the copolymer is prepared as a copolymer composition in which an alternating copolymer of an aromatic vinyl-based monomer and a maleimide-based monomer produced at the beginning of polymerization; a terpolymer of an aromatic vinyl-based monomer, a vinyl cyan-based monomer, and a binary copolymer formed from an aromatic vinyl-based monomer and a vinyl cyan-based monomer after a maleimide-based monomer is consumed, are mixed with each other.

That is, when an aromatic vinyl-based monomer, a vinyl cyan-based monomer, and a maleimide-based monomer are copolymerized, monomer units are not uniformly formed in a copolymer, and a copolymer composition in which copolymers having different repeating units are mixed together is produced, and accordingly, there is a problem in that the glass transition temperature of the copolymer is decreased.

In order to solve the above problem, a method using continuous bulk polymerization or solution polymerization has been proposed when preparing the copolymer. However, when these polymerization methods are used, it is difficult to control the temperature of polymerization due to reaction heat, and the conversion rate of polymerization is limited due to an increase in viscosity, so that unreacted monomers remain. Accordingly, it is necessary to perform a separate process for recovering the unreacted monomers.

In addition to the above methods, a method using emulsion polymerization has also been proposed when preparing the copolymer. However, when the emulsion polymerization method is used, unreacted monomers, polymerization additives, and the like remain in a polymer, causing a problem of coloring or discoloration of the copolymer, and after a slurry is prepared by a solidification process after the polymerization reaction, the slurry is subjected to a post-treatment process of being washed, dehydrated, and dried, so that there is a problem of production efficiency degradation, equipment, and wastewater treatment.

PRIOR ART DOCUMENT

Patent Document (Patent Document 1) JP3241815B2

DISCLOSURE OF THE INVENTION

Technical Problem

An aspect of the present invention provides a method for preparing a copolymer, the method capable of solving the non-uniformity of monomer units in a copolymer, minimizing the production of a copolymer composition in which copolymers having different repeating units are mixed together, thereby preventing a decrease in glass transition temperature.

Technical Solution

According to an aspect of the present invention, there are provided a method for preparing a copolymer, a copolymer prepared therefrom, and a thermoplastic resin composition including the copolymer.

(1) The present invention provides a method for preparing a copolymer, the method including introducing and polymerizing an aromatic vinyl-based monomer, a vinyl cyan-based monomer, and an imide-based monomer S10, wherein the imide-based monomer is introduced at once in an amount of 1 wt % to 24 wt % before the start of polymerization, and is continuously introduced in an amount of 76 wt % to 99 wt % from the start of the polymerization.

(2) In (1) above, the present invention provides a method for preparing a copolymer, wherein the total amount of the aromatic vinyl-based monomer is introduced at once before the start of polymerization.

(3) In (1) or (2) above, the present invention provides a method for preparing a copolymer, wherein the total amount of the vinyl cyan-based monomer is introduced at once before the start of polymerization.

(4) In any one of (1) to (3) above, the present invention provides a method for preparing a copolymer, wherein the imide-based monomer is introduced at once in an amount of 1 wt % to 24 wt % before the start of polymerization, and is continuously introduced in an amount of 76 wt % to 99 wt % from the point of time when the temperature inside a polymerization reactor reaches a polymerization temperature to the point of time when a polymerization conversion rate is 60% to 80%.

(5) In any one of (1) to (4) above, the present invention provides a method for preparing a copolymer, wherein the imide-based monomer continuously introduced from the start of polymerization is continuously and dividedly introduced at a constant speed.

(6) In any one of (1) to (5) above, the present invention provides a method for preparing a copolymer, wherein the imide-based monomer is introduced at once in an amount of 10 wt % to 20 wt % before the start of polymerization, and is introduced in an amount of 80 wt % to 90 wt % after the start of the polymerization.

(7) In any one of (1) to (6) above, the present invention provides a method for preparing a copolymer, wherein the imide-based monomer is introduced in an amount of 31 wt % to 39 wt % based on the total content of monomers introduced including the aromatic vinyl-based monomer, the vinyl cyan-based monomer, and the imide-based monomer.

(8) In any one of (1) to (7) above, the present invention provides a method for preparing a copolymer, wherein the imide-based monomer is introduced in an amount of 32 wt % to 36 wt % based on the total content of monomers introduced including the aromatic vinyl-based monomer, the vinyl cyan-based monomer, and the imide-based monomer.

(9) In any one of (1) to (8) above, the present invention provides a method for preparing a copolymer, wherein the polymerization of Step S10 is performed by suspension polymerization.

(10) The present invention provides a copolymer including an aromatic vinyl-based monomer unit, a vinyl cyan-based monomer unit, and an imide-based monomer unit, wherein the copolymer has a glass transition temperature of 178° C. or higher, and has an amount of change in glass transition temperature (ΔTg) calculated by Equation 1 below of 15° C. or less.

$$\Delta Tg\ (°\ \text{C.})=\text{Max}\ Tg\ (\text{Highest value among polymer glass transition temperatures measured according to polymerization conversion rate when polymerizing copolymer})-\text{Min}\ Tg\ (\text{Lowest value among polymer glass transition temperatures measured according to polymerization conversion rate when polymerizing copolymer}) \quad \text{[Equation 1]}$$

(11) In (10) above, the present invention provides a copolymer, wherein the copolymer includes the vinyl cyan-based monomer unit in an amount of 1 wt % to 20 wt %, and has an amount of change in content of the vinyl cyan-based monomer (ΔAN) calculated by Equation 2 below of 3 wt % or less.

$$\Delta AN\ (\text{wt \%})=\text{Max}\ AN\ (\text{Highest value among contents of vinyl cyan-based monomers in polymers measured according to the polymerization conversion rate when polymerizing copolymer})-\text{Min}\ AN\ (\text{Lowest value among contents of vinyl cyan-based monomers in polymers measured according to the polymerization conversion rate when polymerizing copolymer}) \quad \text{[Equation 2]}$$

(12) The present invention provides a thermoplastic resin composition including the copolymer according to (10) or (11) above and a thermoplastic resin.

Advantageous Effects

According to the method for preparing a copolymer of the present invention, it is possible to prepare a copolymer in which the non-uniformity of monomer units is solved in a copolymer, the production of a copolymer composition in which copolymers having different repeating units are mixed together is minimized, and thus, a decrease in glass transition temperature is prevented.

MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

In the present invention, the term 'monomer unit' may represent a component, structure, or material itself derived from a monomer, and may represent, as a specific example, a repeating unit formed in a polymer as a result of the participation of an introduced monomer in a polymerization reaction when polymerizing the polymer.

The term 'derivative' used in the present invention may represent a compound having a structure in which one or more hydrogen atoms constituting an original compound is substituted with a halogen group, an alkyl group, or a hydroxyl group.

The term 'composition' used in the present invention includes not only a reaction product and a decomposition product formed from materials of a corresponding composition, but also a mixture of materials including the corresponding composition.

The present invention provides a method for preparing a copolymer. Specifically, the method for preparing a copolymer may be a method for preparing a heat-resistant copolymer in which an imide-based monomer is introduced, and may be, as a specific example, a method for preparing a heat-resistant styrene-based copolymer.

According to an embodiment of the present invention, the method for preparing a polymer includes introducing and polymerizing an aromatic vinyl-based monomer, a vinyl cyan-based monomer, and an imide-based monomer S10, wherein the imide-based monomer may be introduced at once in an amount of 1 wt % to 24 wt % before the start of polymerization, and may be continuously introduced in an amount of 76 wt % to 99 wt % from the start of the polymerization.

According to an embodiment of the present invention, the polymerization of Step S10 may be performed by suspension polymerization. A suspension polymerization method uses a water-soluble solvent such as water as a medium, so that there are advantages in that despite a high polymerization conversion rate, it is easy to control a reaction, the amount of additives used is small, and a washing process is simple. In general, the suspension polymerization method is performed as batch polymerization, and performed by introducing reactants including a monomer to be used for polymerization to a reactor at once before the start of the polymerization. At this time, a maleimide-based monomer forms a charge transfer complex with an aromatic vinyl-based monomer such as styrene, thereby forming an alternating copolymer of the aromatic vinyl-based monomer and the maleimide-based monomer at the beginning of polymerization, and as the maleimide-based monomer is consumed, the composition of each monomer in a copolymer is variously changed, which causes the heat resistance of the copolymer to be degraded.

However, in the method for preparing a copolymer according to the present invention, an imide-based monomer is introduced at once in an amount of 1 wt % to 24 wt % before the start of polymerization, and is introduced in an amount of 76 wt % to 99 wt % after the start of the polymerization, so that the non-uniformity of monomer units in a prepared copolymer may be solved, and a drop in the glass transition temperature of the copolymer due to an increase in polymerization reaction elapsed time or polymerization conversion rate may be prevented to maintain the glass transition temperature of the prepared copolymer high.

According to an embodiment of the present invention, the aromatic vinyl-based monomer may be one or more selected from the group consisting of styrene, α-methylstyrene, α-ethylstyrene, p-methylstyrene, o-methylstyrene, o-t-butylstyrene, bromostyrene, chlorostyrene, trichlorostyrene and a derivative thereof, and may be, as a specific example, styrene.

According to an embodiment of the present invention, the aromatic vinyl-based monomer may be introduced in an amount of 30 wt % to 65 wt %, 40 wt % to 60 wt %, or 45 wt % to 55 wt % based on the total content of monomers introduced including the aromatic vinyl-based monomer, the vinyl cyan-based monomer, and the imide-based monomer, and within this range, there are effects of obtaining a copolymer to a high polymerization conversion rate, and achieving excellent compatibility with a thermoplastic resin while maintaining the mechanical properties of the copolymer. In addition, according to an embodiment of the present invention, the total amount of the aromatic vinyl-based monomer may be introduced at once before the start of polymerization in Step S10.

According to an embodiment of the present invention, the vinyl cyan-based monomer may be one or more selected from the group consisting of acrylonitrile, methacrylonitrile, ethacrylonitrile and a derivative thereof, and may be, as a specific example, acrylonitrile.

In addition, according to an embodiment of the present invention, the vinyl cyan-based monomer may be introduced in an amount of 1 wt % to 20 wt %, 5 wt % to 20 wt %, or 5 wt % to 15 wt % based on the total content of monomers introduced including the aromatic vinyl-based monomer, the vinyl cyan-based monomer, and the imide-based monomer, and within this range, there are effects of obtaining a copolymer to a high polymerization conversion rate, achieving excellent compatibility with a thermoplastic resin while maintaining the mechanical properties of the copolymer. In addition, according to an embodiment of the present invention, the total amount of the vinyl cyan-based monomer may be introduced at once before the start of polymerization in Step S10.

According to an embodiment of the present invention, the imide-based monomer may be a maleimide-based monomer, and may be, as a specific example, a maleimide-based monomer in which hydrogen bonded to an N atom of maleimide is substituted with a substituent. As a more specific example, the imide-based monomer may be one or more selected from the group consisting of N-methyl maleimide, N-ethyl maleimide, N-propyl maleimide, N-isopropyl maleimide, N-butyl maleimide, N-isobutyl maleimide, N-t-butyl maleimide, N-cyclohexyl maleimide, N-chlorophenyl maleimide, N-methylphenyl maleimide, N-bromophenyl maleimide, N-lauryl maleimide, N-hydroxyphenyl maleimide, N-methoxyphenyl maleimide, N-carboxyphenyl Maleimide, N-nitrophenyl maleimide, N-phenyl maleimide, 2-methyl-N-phenyl maleimide, N-benzyl maleimide, N-naphthyl maleimide and a derivative thereof, and may be, as a specific example, N-phenyl maleimide.

According to an embodiment of the present invention, the imide-based monomer may be introduced in an amount of 31 wt % to 39 wt %, 32 wt % to 38 wt %, or 32 wt % to 36 wt % based on the total content of monomers introduced including the aromatic vinyl-based monomer, the vinyl cyan-based monomer, and the imide-based monomer, and within this range, there are effects of obtaining a copolymer to a high polymerization conversion rate, preparing a copolymer having a uniform composition of monomer units, and achieving excellent heat resistance of a prepared copolymer. Here, the introduction amount of the imide-based monomer may be the sum of the amount of the imide-based monomer introduced at once before the start of the polymerization in Step S10 and the amount of the imide-based monomer introduced continuously after the start of the polymerization in Step S10.

According to an embodiment of the present invention, the imide-based monomer may be introduced at once in an amount of 1 wt % to 24 wt % before the start of polymerization, and may be continuously introduced in an amount of 76 wt % to 99 wt % from the start of the polymerization. Here, the weight % with respect to the imide-based monomer means a weight % with respect to the total introduction amount of the imide-based monomer introduced during the polymerization in Step S10.

According to an embodiment of the present invention, being continuously introduced may mean that a certain amount is continuously introduced at once according to a polymerization conversion rate, or may mean that a certain amount is continuously and dividedly introduced at a constant speed. The constant speed may mean an introduction speed of the imide-based monomer continuously and dividedly introduced, and may mean, as a specific example, a constant flow rate. That is, according to an embodiment of the present invention, 76 wt % to 99 wt % of the imide-based monomer introduced after the start of the polymerization may be continuously and dividedly introduced at a constant speed, and may be, as a specific example, introduced into a reaction system at a constant flow rate from the start of the polymerization till the end of the introduction. As described above, when 76 wt % to 99 wt % of the imide-based monomer is continuously and dividedly introduced at a constant speed, it is possible to minimize the difference in polymerization speed due to the difference in reactivity between the monomers, so that there is an effect of preparing a copolymer having a uniform composition of monomer units while maintaining a constant polymerization speed.

According to an embodiment of the present invention, the imide-based monomer may be introduced at once in an amount of 1 wt % to 24 wt % before the start of polymerization, and may be continuously introduced in an amount of 76 wt % to 99 wt % from the point of time when the temperature inside a polymerization reactor reaches a polymerization temperature to the point of time when a polymerization conversion rate is 60% to 80%. That is, the start of the polymerization may mean the point of time when the temperature inside a polymerization reactor reaches a polymerization temperature. In addition, 76 wt % to 99 wt % of the imide-based monomer introduced after the start of the polymerization may be introduced to the point of time when a polymerization conversion rate is 60% to 80%, 65% to 80%, 70% to 80%, or 75%, in which case, it is possible to minimize the difference in polymerization speed due to the difference in reactivity between the monomers, so that there is an effect of preparing a copolymer having a uniform composition of monomer units while maintaining a constant polymerization speed.

According to an embodiment of the present invention, the imide-based monomer may be introduced at once in an amount of 1 wt % to 24 wt % before the start of polymerization, and may be continuously introduced in an amount of 76 wt % to 99 wt % for 120 minutes to 240 minutes from the point of time when the temperature inside a polymerization reactor reaches a polymerization temperature. That is, the start of the polymerization may mean the point of time when the temperature inside a polymerization reactor reaches a polymerization temperature. In addition, 76 wt % to 99 wt % of the imide-based monomer introduced after the start of the polymerization may be introduced for 120 minutes to 240 minutes, 150 minutes to 240 minutes, 180 minutes to 240 minutes, or for 210 minutes from the point of time when the temperature inside a polymerization reactor reaches a polymerization temperature, in which case, it is possible to minimize the difference in polymerization speed due to the difference in reactivity between the monomers, so that there is an effect of preparing a copolymer having a uniform composition of monomer units while maintaining a constant polymerization speed.

According to an embodiment of the present invention, the imide-based monomer may be introduced at once in an amount of 5 wt % to 20 wt %, or 10 wt % to 20 wt % before the start of the polymerization, and may be introduced in an amount of 80 wt % to 95 wt %, or 80 wt % to 90 wt % after the start of the polymerization, and within this range, there are effects of solving the non-uniformity of monomer units in a copolymer, minimizing the production of a copolymer composition in which copolymers having different repeating units are mixed together, thereby preventing a decrease in glass transition temperature.

According to an embodiment of the present invention, the method for preparing a copolymer may be performed by a suspension polymerization method, and accordingly, the polymerization may be performed in the presence of one or more additives selected from the group consisting of a water-soluble solvent, a polymerization initiator, a molecular weight control agent, and a dispersant.

According to an embodiment of the present invention, the water-soluble solvent may be ion-exchange water or deionized water.

According to an embodiment of the present invention, the polymerization initiator may be one or more selected from the group consisting of 2,5-dimethyl-2,5-di(t-butylperoxy)hexane, di(t-butylperoxy-isopropyl)benzene, t-butyl cumyl peroxide, di-(t-amyl)-peroxide, dicumyl peroxide, butyl 4,4-di(t-butylperoxy)valerate, t-butylperoxybenzoate, 2,2-di(t-butylperoxy)butane, t-amyl peroxy-benzoate, t-butylperoxy-acetate, t-butylperoxy-(2-ethylhexyl)carbonate, t-butylperoxy isopropyl carbonate, t-butyl peroxy-3,5,5-trimethyl-hexanoate, 1,1-bis(t-butylperoxy)cyclohexane, t-amyl peroxyacetate, t-amylperoxy-(2-ethylhexyl)carbonate, 1,1-di(t-butylperoxy)-3,5,5-trimethylcyclohexane, 1,1-di(t-amylperoxy)cyclohexane, t-butyl-monoperoxy-malate, 1,1'-azodi(hexahydrobenzonitrile) and 1,1'-azobis(cyclohexane-1-cyclonitrile).

According to an embodiment of the present invention, the polymerization initiator may be 0.01 parts by weight to 1.00 parts by weight, 0.02 parts by weight to 0.08 parts by weight, or 0.05 parts by weight to 0.07 parts by weight based on 100 parts by weight of the total content of monomers introduced, and within this range, there is an effect of achieving excellent polymerization stability.

According to an embodiment of the present invention, the molecular weight control agent may be one or more selected from the group consisting of α-methylstyrene dimer, t-dodecyl mercaptan, n-dodecyl mercaptan, octyl mercaptan, carbon tetrachloride, methylene chloride, methylene bromide, tetraethyl thiuram disulfide, dipentamethylene thiuram disulfide, and diisopropylxantogen disulfide.

According to an embodiment of the present invention, the molecular weight control agent may be 0.01 parts by weight to 0.50 parts by weight, 0.10 parts by weight to 0.40 parts by weight, or 0.10 parts by weight to 0.30 parts by weight based on 100 parts by weight of the total content of monomers introduced, and within this range, it is possible to prepare a copolymer having an appropriate weight average molecular weight.

According to an embodiment of the present invention, the dispersant may be one or more selected from the group consisting of water-soluble polyvinyl alcohol, partially saponified polyvinyl alcohol, polyacrylic acid, a copolymer of vinyl acetate and maleic anhydride, hydroxypropyl methylcellulose, gelatin, calcium phosphate, tricalcium phosphate, hydroxyapatite, sorbitan monolaurate, sorbitan trioleate, polyoxyethylene, sodium lauryl sulfate, sodium dodecylbenzenesulfonate, and sodium dioctylsulfosuccinate.

According to an embodiment of the present invention, the dispersant may be 0.5 parts by weight to 2.0 parts by weight, 0.5 parts by weight to 1.5 parts by weight, or 1.0 part by weight to 1.5 parts by weight based on 100 parts by weight of the total content of monomers introduced, and within this range, it is possible to prepare a copolymer having more uniform particles by increasing the dispersion stability of monomers in a polymerization system.

According to an embodiment of the present invention, the method for preparing a copolymer may be performed by further including an auxiliary dispersant, and the auxiliary dispersant may be, as a specific example, a polyoxyethylene-based auxiliary dispersant, and may be, as a more specific example, polyoxyethylene alkyl ether phosphate, in which case there is an effect in that polymerization stability is excellent.

According to an embodiment of the present invention, the method for preparing a copolymer may be performed in a polymerization reactor equipped with a stirrer. Here, the stirrer may continuously impart a stirring force during a polymerization reaction, and at this time, the stirring rate of the stirrer may be 100 RPM to 1,000 RPM, 300 RPM to 800 RPM, or 400 RPM to 600 RPM, and within this range, it is possible to prepare a copolymer having more uniform particles by increasing the dispersion stability of monomers in a polymerization system.

According to an embodiment of the present invention, the polymerization of Step S10 may be performed by 2 or more times of temperature elevation. Here, the temperature elevation may mean increasing the temperature inside a reactor in which a polymerization reaction is performed, and 2 or more times of temperature elevation may mean further performing one or more times of temperature elevation during the polymerization reaction, including the point of time when an initial temperature is reached, and after the initial temperature is reached. As described above, when polymerization is performed through 2 or more times of temperature elevation, it is easy to control reaction heat while preventing a polymerization reaction from occurring explosively, so that it is possible to proceed the polymerization reaction in a mild state, and thereafter, an effect of improving a polymerization conversion rate may be achieved by further performing one or more times of temperature elevation.

According to an embodiment of the present invention, when the polymerization of Step S10 is performed through 2 or more times of temperature elevation, the temperature inside a reactor at the point of time when an initial temperature is reached may be 80° C. to 95° C., 85° C. to 95° C., or 90° C. to 95° C., and within this range, there is an effect of achieving excellent polymerization stability.

According to an embodiment of the present invention, when the polymerization of Step S10 is performed through 2 or more times of temperature elevation, when one or more times of temperature elevation is performed after the initial temperature is reached, the temperature inside a reactor after the temperature elevation may be 100° C. to 130° C., 110° C. to 130° C., or 115° C. to 125° C., and within this range, there is an effect of preparing a copolymer to a high polymerization conversion rate.

According to an embodiment of the present invention, the polymerization of Step S10 may be performed until the polymerization conversion rate is 90% or higher, or 90% to 100%.

As describe above, when a copolymer is prepared by the method for preparing a copolymer according to the present invention, it is possible to solve the non-uniformity of monomer units in the copolymer, maintaining a polymerization reaction to a high polymerization conversion rate, and preventing a drop in glass transition temperature to prepare a copolymer having excellent heat resistance.

In addition, the present invention provides a copolymer prepared by the method for preparing a copolymer. Specifically, the copolymer may be a heat-resistant copolymer including an imide-based monomer unit, and may be, as a more specific example, a heat-resistant styrene-based copolymer.

According to an embodiment of the present invention, the copolymer may include an aromatic vinyl-based monomer unit, a vinyl cyan-based monomer unit, and an imide-based monomer unit, may have a glass transition temperature of 178° C. or higher, and may have an amount of change in glass transition temperature (ΔTg) calculated by Equation 1 below of 15° C. or less.

$\Delta Tg$ (° C.)=Max $Tg$ (Highest value among polymer glass transition temperatures measured according to polymerization conversion rate when polymerizing copolymer)−Min $Tg$ (Lowest value among polymer glass transition temperatures measured according to polymerization conversion rate when polymerizing copolymer) [Equation 1]

According to an embodiment of the present invention, the copolymer may have a glass transition temperature of 178° C. or higher, 178° C. to 190° C., 179° C. to 185° C., or 179° C. to 181° C. As described above, the copolymer according to the present invention has a high glass transition temperature, and thus, has an effect of having excellent heat resistance.

According to an embodiment of the present invention, the aromatic vinyl-based monomer unit, the vinyl cyan-based monomer unit, and the imide-based monomer unit may respectively refer to a repeating unit formed as a result of the participation of an aromatic vinyl-based monomer, a vinyl cyan-based monomer, and an imide-based monomer in a polymerization reaction. As a specific example, the polymerization reaction may be a radical polymerization reaction, and accordingly, the aromatic vinyl-based monomer unit, the vinyl cyan-based monomer unit, and the imide-based monomer unit may respectively refer to a repeating unit derived from a carbon-carbon double bond present in an aromatic vinyl-based monomer, a vinyl cyan-based monomer, and an imide-based monomer.

According to an embodiment of the present invention, the copolymer may be a random copolymer, and the composition of the aromatic vinyl-based monomer unit, the vinyl cyan-based monomer unit, and the imide-based monomer unit in the copolymer may be uniform. When the composition of monomer units are uniform, it may mean that the ratio of each monomer unit present in a polymer which is polymerized and grown by a polymerization reaction of monomers is maintained uniform. As a specific example, it may mean that, as polymerization progresses, when a portion of a polymer in a reactor is collected during the polymerization for each polymerization conversion rate, the ratio of each monomer unit forming the corresponding polymer is maintained uniform.

The present invention calculates and represents the uniformity of the composition of monomer units by ΔTg calculated by Equation 1 above.

ΔTg calculated by Equation 1 above represents the difference between the highest value and the lowest value of the glass transition temperature of a polymer measured in accordance with a polymerization conversion rate during the polymerization of a copolymer. As polymerization progresses, when a portion of a polymer in a reactor is collected during the polymerization for each polymerization conversion rate, the glass transition temperature for each polymer is determined according to the ratio of each monomer unit forming the corresponding polymer. Therefore, it can be seen that the smaller the difference in the glass transition temperature of a copolymer, that is, a polymer for each polymerization conversion rate, the more uniformly maintained the ratio of each monomer unit in the copolymer, that is, the polymer for each polymerization conversion rate.

According to an embodiment of the present invention, the copolymer may have a ΔTg calculated by Equation 1 above of 15° C. or less, 0.1° C. to 15° C., 0.1° C. to 10° C., 0.1° C. to 5° C., or 0.9° C. to 2.7° C., and within this range, the composition of each monomer unit in the copolymer is uniform, so that there is an effect in that the glass transition temperature may be increased, and thus, heat resistance is excellent.

According to an embodiment of the present invention, ΔTg of each polymer calculated by Equation 1 above may be calculated from the glass transition temperature measured from a polymer at the point of time when a polymerization conversion rate is 10%, 30%, 50%, 70%, and 90%.

According to an embodiment of the present invention, the copolymer includes the vinyl cyan-based monomer unit in an amount of 1 wt % to 20 wt %, and may have an amount of change in content of the vinyl cyan-based monomer (ΔAN) calculated by Equation 2 below of 3 wt % or less.

$\Delta AN$ (wt %)=Max $AN$ (Highest value among contents of vinyl cyan-based monomers in polymers measured according to the polymerization conversion rate when polymerizing copolymer)−Min $AN$ (Lowest value among contents of vinyl cyan-based monomers in polymers measured according to the polymerization conversion rate when polymerizing copolymer) [Equation 2]

According to an embodiment of the present invention, the copolymer may include the vinyl cyan-based monomer unit in an amount of 1 wt % to 20 wt %, 5 wt % to 20 wt %, 5 wt % to 15 wt %, or 8 wt % to 10 wt %, which is the content of vinyl cyan-based monomer units present in a copolymer obtained after polymerization is completed, and depending on the final polymerization conversion rate and the degree of participation of the vinyl cyan-based monomer in the polymerization reaction, there may be a difference from the content of the vinyl cyan-based monomer introduced in the method for preparing a copolymer described above.

The present invention calculates and represents the uniformity of the composition of monomer units by ΔAN calculated by Equation 2 above.

ΔAN calculated by Equation 2 above represents the difference between the highest value and the lowest value of the content of vinyl cyan-based monomer units in a polymer measured in accordance with a polymerization conversion rate during the polymerization of a copolymer. As polymerization progresses, when a portion of a polymer in a reactor is collected during the polymerization for each polymerization conversion rate, the content of vinyl cyan-based monomer units for each polymer is determined according to the ratio of each monomer unit forming the corresponding polymer. Therefore, it can be seen that the smaller the difference in the content of vinyl cyan-based monomer units in a copolymer, that is, a polymer for each polymerization conversion rate, the more uniformly maintained the ratio of each monomer unit in the copolymer, that is, the polymer for each polymerization conversion rate.

According to an embodiment of the present invention, the copolymer may have a ΔAN calculated by Equation 2 above of 3.0 wt % or less, 2.5 wt % or less, 2.0 wt %, 1.5 wt %, 0.1 wt % to 1.5 wt %, 0.5 wt % to 1.5 wt %, or 0.9 wt % to 1.2 wt %, and within this range, the composition of each monomer unit in the copolymer is uniform, so that there is an effect in that the glass transition temperature may be increased, and thus, heat resistance is excellent.

According to an embodiment of the present invention, ΔAN of each polymer calculated by Equation 2 above may be calculated from the content of vinyl cyan-based monomer units in a copolymer measured from a polymer at the point of time when a polymerization conversion rate is 10%, 30%, 50%, 70%, and 90%.

In addition, the present invention provides a resin composition including the copolymer. Specifically, the resin composition may be a thermoplastic resin composition including the copolymer and a thermoplastic resin. As a specific example, the thermoplastic resin composition may include the copolymer and a diene-based graft copolymer.

According to an embodiment of the present invention, the diene-based graft copolymer may be an acrylonitrile-butadiene-styrene-based copolymer, and the acrylonitrile-butadiene-styrene-based copolymer serves to provide excellent moldability and impact resistance to a thermoplastic resin composition, and may be a graft copolymer of a core-shell structured including a core having a conjugated diene-based monomer unit, and a shell surrounding the core and having an aromatic vinyl-based monomer unit and a vinyl cyan-based monomer unit.

According to an embodiment of the present invention, an aromatic vinyl-based monomer of the diene-based graft copolymer may be one or more selected from the group consisting of styrene, α-methylstyrene, α-ethylstyrene, p-methylstyrene, o-methylstyrene, o-t-butylstyrene, bromostyrene, chlorostyrene, trichlorostyrene and a derivative thereof, and may be, as a specific example, styrene.

According to an embodiment of the present invention, a vinyl cyan-based monomer of the diene-based graft copolymer may be one or more selected from the group consisting of acrylonitrile, methacrylonitrile, ethacrylonitrile and a derivative thereof, and may be, as a specific example, acrylonitrile.

According to an embodiment of the present invention, a conjugated diene-based monomer of the diene-based graft copolymer may be one or more selected from the group consisting of 1,3-butadiene, 2,3-dimethyl-1,3-butadiene, 2-ethyl-1,3-butadiene, 1,3-pentadiene, and isoprene, and may be, as a specific example, 1,3-butadiene.

According to an embodiment of the present invention, the acrylonitrile-butadiene-styrene-based copolymer may be prepared through emulsion polymerization and emulsion graft polymerization, and may be prepared by, for example, subjecting a conjugated diene-based monomer to emulsion polymerization to prepare a core (or a seed) which is a rubbery polymer, and then adding a vinyl cyan-based monomer and an aromatic vinyl-based monomer to the core, followed by performing emulsion graft polymerization.

According to an embodiment of the present invention, the acrylonitrile-butadiene-styrene-based copolymer may include a core having a conjugated diene-based monomer unit in an amount of 30 wt % to 70 wt %, and a shell surrounding the core and having an aromatic vinyl-based monomer unit and a vinyl cyan-based monomer unit in an amount of 30 wt % to 70 wt %, and at this time, the shell may include the aromatic vinyl-based monomer unit and the vinyl cyan-based monomer unit at a weight ratio of 7:3 to 8:2, in which case the impact resistance, mechanical properties and moldability of the copolymer may be more excellent.

The thermoplastic resin composition according to an embodiment of the present invention may further include, if necessary, one or more additives selected from the group consisting of an impact modifier, a lubricant, a heat stabilizer, an anti-dripping agent, an antioxidant, a light stabilizer, a sunscreen, a pigment, and an inorganic filler, and in this case, the additive may be used in an amount of 5.0 parts by weight or less, or 0.1 parts by weight to 1.0 part by weight based on 100 parts by weight of the copolymer and the thermoplastic resin.

According to an embodiment of the present invention, specific materials of the additive may be used without particular limitation as long as they are used in a thermoplastic resin composition, but for example, as the anti-dripping agent, one or more selected from the group consisting of Teflon, polyamide, polysilicon, polytetrafluoroethylene (PTFE) and a tetrafluoroethylene-hexafluoropropylene (TFE-HFP) copolymer may be used in terms of further improving flame retardancy, and as the inorganic filler, one or more selected from the group consisting of barium sulfate, a barium glass filler, and a barium oxide may be used.

Hereinafter, embodiments of the present invention will be described in detail so that those skilled in the art may easily carry out the present invention. However, the present invention may be embodied in many different forms, and is not limited to the embodiments set forth herein.

EXAMPLES

Example 1

To a polymerization reactor equipped with a stirrer, 140 parts by weight of ion-exchange water, 48 parts by weight of styrene, 12 parts by weight of acrylonitrile, and 4 parts by weight of N-phenyl maleimide, and as a polymerization initiator, 0.05 parts by weight of 1,1-bis(t-butylperoxy)

cyclohexane and 0.01 parts by weight of t-butylperoxybenzoate, and as a dispersant, 1.3 parts by weight of tricalcium phosphate, and as a molecular weight control agent, 0.2 parts by weight of t-dodecyl mercaptan were introduced at once, and while operating the stirrer at 500 RPM, the temperature was elevated to 90° C. to initiate polymerization. From the point of time when the temperature inside the reactor reached 90° C., 36 parts by weight of N-phenyl maleimide was continuously introduced for 210 minutes while maintaining the same introduction speed to perform the polymerization. When the continuous introduction of N-phenyl maleimide was terminated, the polymerization conversion rate was 74.7%. From the point of time when the temperature inside the reactor reached 90° C., polymerization was performed for 240 minutes, and thereafter, the temperature inside the reactor reached was elevated to 120° C. to further perform the polymerization for 120 minutes, and the polymerization was terminated after being performed for 360 minutes in total. At this time, the final polymerization conversion rate was 98.6%. Thereafter, formic acid was introduced to a slurry subjected to the polymerization, and the pH of the slurry was adjusted to 2.5 to remove the dispersant, followed by washing, dehydrating, and drying to prepare a bead-type copolymer.

Here, each part by weight is a part by weight based on 100 parts by weight of the total introduction amount of monomers.

Example 2

The same was performed in the same manner as in Example 1 except that in Example 1, before polymerization, N-phenyl maleimide was introduced in an amount of 6 parts by weight, instead of 4 parts by weight, and from the point of time when the temperature inside the reactor reached 90° C., N-phenyl maleimide was continuously introduced in an amount of 34 parts by weight, instead of 36 parts by weight, for 210 minutes while maintaining the same introduction speed to perform the polymerization. When the continuous introduction of N-phenyl maleimide was terminated, the polymerization conversion rate was 75.0%, and the final polymerization conversion rate was 98.7%.

Example 3

The same was performed in the same manner as in Example 1 except that in Example 1, before polymerization, N-phenyl maleimide was introduced in an amount of 8 parts by weight, instead of 4 parts by weight, and from the point of time when the temperature inside the reactor reached 90° C., N-phenyl maleimide was continuously introduced in an amount of 32 parts by weight, instead of 36 parts by weight, for 210 minutes while maintaining the same introduction speed to perform the polymerization. When the continuous introduction of N-phenyl maleimide was terminated, the polymerization conversion rate was 75.2%, and the final polymerization conversion rate was 98.5%.

Comparative Example 1

The same was performed in the same manner as in Example 1 except that in Example 1, before polymerization, N-phenyl maleimide was not introduced, and from the point of time when the temperature inside the reactor reached 90° C., N-phenyl maleimide was continuously introduced in an amount of 40 parts by weight for 210 minutes while maintaining the same introduction speed to perform the polymerization. When the continuous introduction of N-phenyl maleimide was terminated, the polymerization conversion rate was 74.6%, and the final polymerization conversion rate was 98.4%.

Comparative Example 2

The same was performed in the same manner as in Example 1 except that in Example 1, before polymerization, N-phenyl maleimide was introduced in an amount of 10 parts by weight, instead of 4 parts by weight, and from the point of time when the temperature inside the reactor reached 90° C., N-phenyl maleimide was continuously introduced in an amount of 30 parts by weight, instead of 36 parts by weight, for 210 minutes while maintaining the same introduction speed to perform the polymerization. When the continuous introduction of N-phenyl maleimide was terminated, the polymerization conversion rate was 75.2%, and the final polymerization conversion rate was 98.5%.

Comparative Example 3

The same was performed in the same manner as in Example 1 except that in Example 1, before polymerization, N-phenyl maleimide was introduced in an amount of 20 parts by weight, instead of 4 parts by weight, and from the point of time when the temperature inside the reactor reached 90° C., N-phenyl maleimide was continuously introduced in an amount of 20 parts by weight, instead of 36 parts by weight, for 210 minutes while maintaining the same introduction speed to perform the polymerization. When the continuous introduction of N-phenyl maleimide was terminated, the polymerization conversion rate was 75.4%, and the final polymerization conversion rate was 98.6%.

Comparative Example 4

The same was performed in the same manner as in Example 1 except that in Example 1, before polymerization, N-phenyl maleimide was introduced in an amount of 30 parts by weight, instead of 4 parts by weight, and from the point of time when the temperature inside the reactor reached 90° C., N-phenyl maleimide was continuously introduced in an amount of 10 parts by weight, instead of 36 parts by weight, for 210 minutes while maintaining the same introduction speed to perform the polymerization. When the continuous introduction of N-phenyl maleimide was terminated, the polymerization conversion rate was 76.4%, and the final polymerization conversion rate was 98.4%.

Comparative Example 5

The same was performed in the same manner as in Example 1 except that in Example 1, before polymerization, N-phenyl maleimide was introduced in an amount of 40 parts by weight, instead of 4 parts by weight, and while the polymerization was being performed from the point of time when the temperature inside the reactor reached 90° C., N-phenyl maleimide was not separately introduced. The final polymerization conversion rate was 98.5%.

Comparative Example 6

To a polymerization reactor equipped with a stirrer, 140 parts by weight of ion-exchange water, and as a polymerization initiator, 0.05 parts by weight of 1,1-bis(t-butylperoxy)cyclohexane and 0.01 parts by weight of t-butylperoxybenzoate, and as a dispersant, 1.3 parts by weight of tricalcium phosphate, and as a molecular weight control agent, 0.2 parts by weight of t-dodecyl mercaptan were introduced at once, and while operating the stirrer at 500 RPM, the temperature was elevated to 90° C. From the point of time when the temperature inside the reactor reached 90° C., 48 parts by weight of styrene, 12 parts by weight of acrylonitrile, and 40 parts by weight of N-phenyl maleimide were continuously introduced for 210 minutes while maintaining the same introduction speed to perform polymerization. When the continuous introduction of styrene, acrylonitrile, and N-phenyl maleimide was terminated, the polymerization conversion rate was 74.8%. From the point of time when the temperature inside the reactor reached 90° C., polymerization was performed for 240 minutes, and thereafter, the temperature inside the reactor reached was elevated to 120° C. to further perform the polymerization for 120 minutes, and the polymerization was terminated after being performed for 360 minutes in total. At this time, the final polymerization conversion rate was 98.4%. Thereafter, formic acid was introduced to a slurry subjected to the polymerization, and the pH of the slurry was adjusted to 2.5 to remove the dispersant, followed by washing, dehydrating, and drying to prepare a bead-type copolymer.

Here, each part by weight is a part by weight based on 100 parts by weight of the total introduction amount of monomers.

Comparative Example 7

To a polymerization reactor equipped with a stirrer, 140 parts by weight of ion-exchange water, 48 parts by weight of styrene, 12 parts by weight of acrylonitrile, and 4 parts by weight of N-phenyl maleimide, and as a polymerization initiator, 0.05 parts by weight of 1,1-bis(t-butylperoxy) cyclohexane and 0.01 parts by weight of t-butylperoxybenzoate, and as a dispersant, 1.3 parts by weight of tricalcium phosphate, and as a molecular weight control agent, 0.2 parts by weight of t-dodecyl mercaptan were introduced at once, and while operating the stirrer at 500 RPM, the temperature was elevated to 90° C. to initiate polymerization. From the point of time when the polymerization conversion rate reached 30% (40 minutes after the point of time when the temperature inside the reactor reacted 90° C.), 36 parts by weight of N-phenyl maleimide was continuously introduced while maintaining the same introduction speed to perform the polymerization. When the continuous introduction of N-phenyl maleimide was terminated, the polymerization conversion rate was 76.0%. From the point of time when the temperature inside the reactor reached 90° C., polymerization was performed for 240 minutes, and thereafter, the temperature inside the reactor reached was elevated to 120° C. to further perform the polymerization for 120 minutes, and the polymerization was terminated after being performed for 360 minutes in total. At this time, the final polymerization conversion rate was 98.5%. Thereafter, formic acid was introduced to a slurry subjected to the polymerization, and the pH of the slurry was adjusted to 2.5 to remove the dispersant, followed by washing, dehydrating, and drying to prepare a bead-type copolymer.

Here, each part by weight is a part by weight based on 100 parts by weight of the total introduction amount of monomers.

Experimental Examples

When preparing the copolymers of Examples 1 to 3 and Comparative Examples 1 to 7, the introduction timing and content for each monomer, and the content of vinyl cyan-based monomer units in a copolymer and the glass transition temperature at the point of time when the polymerization conversion was 15%, 30%, 50%, 70% and 90% were respectively measured, and an amount of change in glass transition temperature (ΔTg) was calculated by Equation 1 below, and an amount of change in content of the vinyl cyan-based monomer (ΔAN) was calculated by Equation 2 below, and are shown in Tables 1 to 3 below.

ΔTg (° C.)=Max Tg (Highest value among polymer glass transition temperatures measured according to polymerization conversion rate when polymerizing copolymer)−Min Tg (Lowest value among polymer glass transition temperatures measured according to polymerization conversion rate when polymerizing copolymer) [Equation 1]

ΔAN (wt %)=Max AN (Highest value among contents of vinyl cyan-based monomers in polymers measured according to the polymerization conversion rate when polymerizing copolymer)−Min AN (Lowest value among contents of vinyl cyan-based monomers in polymers measured according to the polymerization conversion rate when polymerizing copolymer) [Equation 2]

Polymerization conversion rate (%): When preparing the copolymers of Examples and Comparative Examples, a sample of 4 g of the polymer was collected and completely dissolved in tetrahydrofuran (THF). Thereafter, methanol (MeCH) was introduced to obtain a precipitate, and the obtained precipitate was vacuum-dried to completely remove the solvent so as to obtain a dry polymer. The weight of the obtained dry polymer was measured to calculate a polymerization conversion rate through Equation 3 below.

Polymerization conversion rate (%)=[(Weight of dry polymer)/(Total weight of monomers introduced when preparing 4 g of polymer)]×100 [Equation 3]

Content of vinyl cyan-based monomer units in copolymer (wt %): When preparing the copolymers of Examples and Comparative Examples, for each polymerization conversion rate, a sample of 4 g was collected from the polymer and the copolymer, and then the sample was dried for 2 hours under the condition of 220° C. using a vacuum oven, and the content of vinyl cyan-based monomer units in the copolymer was measured using an element analyzer (Thermo Corporation, Flash 2000 Elemental Analyzer) by an elemental analysis method under the following analysis conditions.

CHNS Reactor Temperature: 900° C.
Oxygen Reactor Temperature: 1,060° C.
GC Oven Temperature: 65° C.
Helium Carrier Flow: 140 ml/min for CHNS, 100 ml/min for Oxygen
Helium Reference Flow: 100 ml/min
Oxygen Flow: 250 ml/min for CHNS
Oxygen injection Time: 5 Sec for CHNS
Sample Delay: 12 Sec for CHNS, 0 sec for Oxygen
Total Run Time: 720 Sec for CHNS, 500 Sec for Oxygen Glass transition temperature (Tg, ° C.): When preparing the copolymers of Examples and Comparative Examples, for each polymerization conversion rate, a sample of 0.01 g was collected from the polymer and the copolymer, and then using a differential scanning calorimeter (DSC: TA instrument), a first heating was performed on the sample from room temperature (20° C. to 25° C.) to 250° C. to remove foreign substances, and then the sample was cooled to room temperature (20° C. to 25° C.), followed by being subjected to a second heating to 250° C., through which the glass transition temperature was measured.

TABLE 1

| | | | Examples | | |
|---|---|---|---|---|---|
| | Classifications | | 1 | 2 | 3 |
| Monomers introduced before the start of polymerization | Styrene | (Parts by weight) | 48 | 48 | 48 |
| | Acrylonitrile | (Parts by weight) | 12 | 12 | 12 |
| | N-phenyl maleimide | (Parts by weight) | 4 | 6 | 8 |

TABLE 1-continued

| | | | Examples | | |
|---|---|---|---|---|---|
| | Classifications | | 1 | 2 | 3 |
| Monomer introduced from the start of polymerization | N-phenyl maleimide | (Parts by weight) | 36 | 34 | 32 |
| Content of vinyl cyan-based monomer units in copolymer | Polymerization conversion rate 15% | (wt %) | 9.0 | 8.3 | 7.7 |
| | Polymerization conversion rate 30% | (wt %) | 8.3 | 8.0 | 7.3 |
| | Polymerization conversion rate 50% | (wt %) | 7.9 | 8.2 | 8.0 |
| | Polymerization conversion rate 70% | (wt %) | 8.6 | 8.5 | 8.3 |
| | Polymerization conversion rate 90% | (wt %) | 9.1 | 8.9 | 8.8 |

TABLE 1-continued

| | | | Examples | | |
|---|---|---|---|---|---|
| | Classifications | | 1 | 2 | 3 |
| | ΔAN | (wt %) | 1.2 | 0.9 | 1.1 |
| Copolymer glass transition temperature | Polymerization conversion rate 15% | (° C.) | 179.2 | 180.6 | 182.4 |
| | Polymerization conversion rate 30% | (° C.) | 180.2 | 181.2 | 182.9 |
| | Polymerization conversion rate 50% | (° C.) | 181.8 | 180.8 | 181.6 |
| | Polymerization conversion rate 70% | (° C.) | 180.6 | 180.5 | 180.8 |
| | Polymerization conversion rate 90% | (° C.) | 179.8 | 180.3 | 180.2 |
| | ΔTg | (° C.) | 2.6 | 0.9 | 2.7 |

TABLE 2

| | | | Comparative Examples | | | | |
|---|---|---|---|---|---|---|---|
| | Classifications | | 1 | 2 | 3 | 4 | 5 |
| Monomers introduced before the start of polymerization | Styrene | (Parts by weight) | 48 | 48 | 48 | 48 | 48 |
| | Acrylonitrile | (Parts by weight) | 12 | 12 | 12 | 12 | 12 |
| | N-phenyl maleimide | (Parts by weight) | — | 10 | 20 | 30 | 40 |
| Monomer introduced from the start of polymerization | N-phenyl maleimide | (Parts by weight) | 40 | 30 | 20 | 10 | — |
| Content of vinyl cyan-based monomer units in copolymer | Polymerization conversion rate 15% | (wt %) | 15.2 | 5.1 | 4.6 | 2.4 | 2.3 |
| | Polymerization conversion rate 30% | (wt %) | 11.1 | 5.3 | 4.9 | 3.0 | 2.7 |
| | Polymerization conversion rate 50% | (wt %) | 9.1 | 5.1 | 5.0 | 4.7 | 2.8 |
| | Polymerization conversion rate 70% | (wt %) | 7.8 | 5.7 | 5.6 | 4.9 | 4.4 |
| | Polymerization conversion rate 90% | (wt %) | 7.5 | 8.5 | 8.8 | 9.3 | 9.8 |
| | ΔAN | (wt %) | 7.7 | 3.4 | 4.2 | 6.9 | 7.5 |
| Copolymer glass transition temperature | Polymerization conversion rate 15% | (° C.) | 139.6 | 196.1 | 202.8 | 215.5 | 216.6 |
| | Polymerization conversion rate 30% | (° C.) | 166.5 | 194.1 | 201.2 | 211.2 | 214.0 |
| | Polymerization conversion rate 50% | (° C.) | 179.9 | 195.6 | 200.5 | 204.9 | 209.7 |
| | Polymerization conversion rate 70% | (° C.) | 183.1 | 190.2 | 190.5 | 202.1 | 205.5 |
| | Polymerization conversion rate 90% | (° C.) | 183.6 | 180.1 | 177.0 | 171.0 | 168.3 |
| | ΔTg | (° C.) | 44.0 | 16.0 | 25.8 | 44.5 | 48.3 |

TABLE 3

| | | | Comparative Examples | |
|---|---|---|---|---|
| Classifications | | | 6 | 7 |
| Monomers introduced before the start of polymerization | Styrene | (Parts by weight) | — | 48 |
| | Acrylonitrile | (Parts by weight) | — | 12 |
| | N-phenyl maleimide | (Parts by weight) | | 4 |
| Monomer introduced from the start of polymerization | Styrene | (Parts by weight) | 48 | — |
| | Acrylonitrile | (Parts by | 12 | — |

TABLE 3-continued

| Classifications | | | Comparative Examples 6 | Comparative Examples 7 |
|---|---|---|---|---|
| | N-phenyl maleimide | weight) (Parts by weight) | 40 | — |
| Monomers introduced from the time of 30% polymerization conversion rate | N-phenyl maleimide | (Parts by weight) | — | 36 |
| Content of vinyl cyan-based monomer units in copolymer | Polymerization conversion rate 15% | (wt %) | 2.2 | 9.8 |
| | Polymerization conversion rate 30% | (wt %) | 2.3 | 11.3 |
| | Polymerization conversion rate 50% | (wt %) | 2.9 | 8.8 |
| | Polymerization conversion rate 70% | (wt %) | 4.2 | 7.7 |
| | Polymerization conversion rate 90% | (wt %) | 10.1 | 7.2 |
| | ΔAN | (wt %) | 7.9 | 4.1 |
| Copolymer glass transition temperature | Polymerization conversion rate 15% | (° C.) | 216.8 | 168.9 |
| | Polymerization conversion rate 30% | (° C.) | 213.8 | 164.1 |
| | Polymerization conversion rate 50% | (° C.) | 211.0 | 182.2 |
| | Polymerization conversion rate 70% | (° C.) | 206.4 | 183.8 |
| | Polymerization conversion rate 90% | (° C.) | 167.8 | 184.5 |
| | ΔTg | (° C.) | 49.0 | 20.4 |

As shown in Tables 1 to 3, it has been confirmed that the copolymers prepared according to the method for preparing a copolymer of the present invention each exhibits a high glass transition temperature, and the content of vinyl cyan-based monomer units in the copolymer and the glass transition temperature were maintained at a similar level without a large deviation during the polymerization. Particularly, it has been confirmed that from the results of ΔAN, the deviation in the content of vinyl cyan-based monomer units in the copolymer for each polymerization conversion was very small, and from the results of ΔTg, the deviation in the glass transition temperature of the copolymer for each polymerization conversion was very small. From the above, it has been confirmed that in the copolymers of Examples 1 to 3 prepared according to the method for preparing a copolymer, monomer units in the copolymers are uniformly formed, while minimizing an alternating copolymer of an aromatic vinyl-based monomer and a maleimide-based monomer; a terpolymer of an aromatic vinyl-based monomer, a vinyl cyan-based monomer, and a maleimide-based monomer; and a binary copolymer formed from an aromatic vinyl-based monomer and a vinyl cyan-based monomer after a maleimide-based monomer is consumed from being mixed with each other and prepared.

On the contrary, in the case of Comparative Example 1 in which the total amount of the imide-based monomer was continuously introduced after the start of the polymerization, the vinyl cyanide-based monomer participated in the polymerization reaction at a high rate at the beginning of the polymerization, but as the imide-based monomer was introduced, the participation rate was gradually decreased, so that it was confirmed that ΔAN sharply increased, and ΔTg was also very high, which confirms that the composition of monomer units in the copolymer was very non-uniform.

In addition, in the case of Comparative Examples 2 and 3 in which the content of the imide-based monomer introduced before the start of the polymerization and the content of the imide-based monomer continuously introduced after the start of the polymerization were adjusted to a range close to the range limited by the present invention, deviations according to ΔAN and ΔTg were slightly reduced compared to Comparative Example 1, but not to a sufficient level.

In addition, in the case of Comparative Example 4 in which the imide-based monomer was introduced in an amount of 75 wt % before the start of the polymerization, and in the case of Comparative Example 5 in which the total amount of the imide-based monomer was introduced before the start of the polymerization, at the time when the temperature was elevated to initiate the polymerization, the polymerization had already proceeded rapidly, and as the polymerization progressed, only the vinyl cyanide monomer remained to continue the polymerization reaction continued, so that as the polymerization progressed, the glass transition temperature was significantly dropped, and accordingly, it was confirmed that ΔAN increased and ΔTg was also very high.

In addition, in the case of Comparative Example 6 in which the total amounts of the aromatic vinyl-based monomer, the vinyl cyan-based monomer unit, and the imide-based monomer were continuously introduced, the vinyl cyanide-based monomer did not participate in the polymerization reaction at the beginning of the polymerization, but as the polymerization progressed toward the end, only the vinyl cyanide monomer remained to continue the polymerization reaction continued, so that as the polymerization progressed, the glass transition temperature was significantly dropped, and accordingly, it has been confirmed that ΔAN increased and ΔTg was also very high.

In addition, in the case of Comparative Example 7 in which the imide-based monomer was introduced not from the start of the polymerization but from the point of time when the polymerization conversion rate reached 30%, it has been confirmed that both ΔAN and ΔTg were higher than those of Example 1 in which the same amount of the imide-based monomer was introduced from the start of the polymerization.

From the above results, it has been confirmed that according to the method for preparing a copolymer of the present invention, it is possible to prepare a copolymer in which the non-uniformity of monomer units is solved in it copolymer, the production of a copolymer composition in which copolymers having different repeating units are mixed together in which a is minimized, and thus, a decrease in glass transition temperature is prevented.

The invention claimed is:

1. A method for preparing a copolymer, the method comprising:

introducing and polymerizing an aromatic vinyl-based monomer, a vinyl cyan-based monomer, and an imide-based monomer, wherein the imide-based monomer is introduced at once in an amount of 10 wt % to 24 wt % before start of the polymerization, and is continuously introduced in an amount of 76 wt % to 90 wt % from a point of time when a temperature inside a polymerization reactor reaches a polymerization temperature to a point of time when a polymerization conversion rate is 60% to 80%.

2. The method of claim 1, wherein the total amount of the aromatic vinyl-based monomer is introduced at once before the start of the polymerization.

3. The method of claim 1, wherein the total amount of the vinyl cyan-based monomer is introduced at once before the start of the polymerization.

4. The method of claim 1, wherein the imide-based monomer continuously introduced from the start of the polymerization is continuously and dividedly introduced at a constant speed.

5. The method of claim 1, wherein the imide-based monomer is introduced at once in an amount of 10 wt % to 20 wt % before the start of the polymerization, and is introduced in an amount of 80 wt % to 90 wt % after the start of the polymerization.

6. The method of claim 1, wherein the polymerization is performed by suspension polymerization.

7. A copolymer comprising:

an aromatic vinyl-based monomer unit;

a vinyl cyan-based monomer unit; and an imide-based monomer unit, wherein the copolymer has a glass transition temperature of 178° C. or higher, and has an amount of change in glass transition temperature (ΔTg) of 15° C. or less as calculated by Equation 1 below:

$\Delta Tg$ (° C.)=Max $Tg$ (Highest value among polymer glass transition temperatures measured according to polymerization conversion rate when polymerizing copolymer)−Min $Tg$ (Lowest value among polymer glass transition temperatures measured according to polymerization conversion rate when polymerizing copolymer), and [Equation 1]

wherein ΔTg calculated by Equation 1 is calculated from polymer glass transition temperatures measured at a point of time when the polymerization conversion rate is 10%, 30%, 50%, 70%, and 90%.

8. The copolymer of claim 7, wherein the copolymer comprises the vinyl cyan-based monomer unit in an amount of 1 wt % to 20 wt %, and has an amount of change in content of the vinyl cyan-based monomer (ΔAN) of 3 wt % or less as calculated by Equation 2 below:

$\Delta AN$ (wt %)=Max $AN$ (Highest value among contents of vinyl cyan-based monomers in polymers measured according to the polymerization conversion rate when polymerizing copolymer)−Min $AN$ (Lowest value among contents of vinyl cyan-based monomers in polymers measured according to the polymerization conversion rate when polymerizing copolymer), and [Equation 2]

wherein ΔAN calculated by Equation 2 is calculated from contents of vinyl cyan-based monomer units in polymers measured at the point of time when a polymerization conversion rate is 10%, 30%, 50%, 70%, and 90%.

9. A thermoplastic resin composition comprising the copolymer according to claim 7 and a thermoplastic resin.

10. The method of claim 2, wherein the total amount of the vinyl cyan-based monomer is introduced at once before the start of the polymerization, wherein the total amount of the aromatic vinyl-based monomer is in a range of from 45 wt % to 55 wt % based on the total content of monomers introduced, and wherein the total amount of the vinyl cyan-based monomer is in a range of from 5 wt % to 15 wt % based on the total content of monomers introduced.

11. The method of claim 2, wherein the total amount of the vinyl cyan-based monomer is introduced at once before the start of the polymerization, wherein the total amount of the aromatic vinyl-based monomer is in a range of from 45 wt % to 48 wt % based on the total content of monomers introduced, and wherein the total amount of the vinyl cyan-based monomer is in a range of from 12 wt % to 15 wt % based on the total content of monomers introduced.

12. The copolymer of claim 7, wherein the copolymer has a glass transition temperature of 178° C. to 190° C., and wherein the amount of change in glass transition temperature (ΔTg) is 0.1° C. to 5° C.

* * * * *